(12) United States Patent
Ishigaki et al.

(10) Patent No.: US 12,269,409 B2
(45) Date of Patent: Apr. 8, 2025

(54) AIRBAG DEVICE

(71) Applicant: Autoliv Development AB, Vargarda (SE)

(72) Inventors: Ryota Ishigaki, Kanagawa (JP); Yutaka Nakajima, Kanagawa (JP); Yuka Miura, Kanagawa (JP); Ryo Takebayashi, Kanagawa (JP); Masaru Habu, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/577,084

(22) PCT Filed: Jun. 16, 2022

(86) PCT No.: PCT/JP2022/024230
§ 371 (c)(1),
(2) Date: Jan. 5, 2024

(87) PCT Pub. No.: WO2023/282017
PCT Pub. Date: Jan. 12, 2023

(65) Prior Publication Data
US 2024/0286573 A1  Aug. 29, 2024

(30) Foreign Application Priority Data
Jul. 9, 2021  (JP) ................... 2021-114624

(51) Int. Cl.
*B60R 21/207* (2006.01)
*B60R 21/233* (2006.01)
*B60R 21/2338* (2011.01)

(52) U.S. Cl.
CPC .......... *B60R 21/207* (2013.01); *B60R 21/233* (2013.01); *B60R 21/2338* (2013.01); *B60R 2021/23324* (2013.01)

(58) Field of Classification Search
CPC .......... B60R 21/23138; B60R 21/2338; B60R 2021/23146; B60R 21/207; B60R 21/231;
(Continued)

(56) References Cited

U.S. PATENT DOCUMENTS

2018/0201221 A1* 7/2018 Kato .................. B60R 21/233
2018/0236962 A1* 8/2018 Ohno ................. B60R 21/207
2018/0326938 A1* 11/2018 Rickenbach ........ B60R 21/2338

FOREIGN PATENT DOCUMENTS

JP    2017-030679 A    2/2017
JP    2017-185978 A    10/2017
(Continued)

*Primary Examiner* — Jason D Shanske
*Assistant Examiner* — Scott Lawrence Strickler
(74) *Attorney, Agent, or Firm* — Foley & Lardner LLP

(57) ABSTRACT

Problem
To provide a revolutionary airbag device that can protect an occupant's head from one side, to the front, to the other side.
Resolution Means
The present invention is an airbag device stored in a vehicle seat, the airbag device including: an inflator for generating expansion gas; and an airbag for deploying from near an upper end of the vehicle seat to protect the periphery of the head of an occupant. Furthermore, the airbag includes: a first chamber for protecting one side of an occupant; a second chamber connected to the first chamber and for protecting the front of the occupant's head; a third chamber connected to the second chamber and for deploying from the front of the occupant's head across to the other side of the occupant; and a fourth chamber connected to the third chamber and for deploying at the other side of the occupant.

13 Claims, 13 Drawing Sheets

(58) Field of Classification Search
CPC ........ B60R 21/233; B60R 2021/23386; B60R 2021/0039; B60R 21/16; B60R 2021/23308; B60R 21/23107
See application file for complete search history.

(56) References Cited

FOREIGN PATENT DOCUMENTS

| | | |
|---|---|---|
| JP | 2019-137307 A | 12/2019 |
| JP | 2019-218013 A | 12/2019 |

* cited by examiner

From above

AIRBAG DEVICE

TECHNICAL FIELD

The present invention relates to an airbag device equipped in a vehicle seat, and particularly relates to an airbag device that can appropriately protect the head of an occupant.

BACKGROUND ART

Providing a vehicle with one or a plurality of airbag devices in order to protect an occupant therein in the event of a vehicle accident is well known. There are various forms of airbag devices, such as so-called driver airbag devices that deploy from near the center of a steering wheel to protect a driver, curtain airbags that deploy downward inside a window to protect an occupant in the event of a lateral impact, rollover, or overturning accident, side airbag devices that are deployed to a side of an occupant (side of a seat) to protect the occupant in the event of a lateral impact of the vehicle, and the like. The present invention relates to a novel side airbag device provided in a vehicle seat.

Side airbag devices restrain the movement of an occupant in a lateral direction using an airbag that deploys to the front from a seat, and such devices capable of protecting not only the body but head of an occupant, as in the invention disclosed in Patent Document 1 for example, have been proposed.

However, the airbag device disclosed in Patent Document 1 can restrain one side of an occupant's head (either left or right side) with a deployed airbag, but it is virtually impossible for such devices to protect an entire area including the front of the head.

RELATED ART DOCUMENTS

Patent Documents

Patent Document 1: Japanese Unexamined Patent Application Publication 2019-137307

SUMMARY OF THE INVENTION

Problem to be Solved by the Invention

In view of the foregoing, an object of the present invention is to provide a revolutionary airbag device that can protect an occupant's head from one side, to the front, to the other side.

Means for Solving the Problem

In order to solve the problem above, the present invention is an airbag device stored in a vehicle seat, the airbag device including: an inflator for generating expansion gas; and an airbag for deploying from near an upper end of the vehicle seat to protect the periphery of the head of an occupant. Furthermore, the airbag includes: a first chamber for protecting one side of an occupant; a second chamber connected to the first chamber and for protecting the front of the occupant's head; a third chamber connected to the second chamber and for deploying from the front of the occupant's head across to the other side of the occupant; and a fourth chamber connected to the third chamber and for deploying at the other side of the occupant.

According to the present invention, the airbag surrounds the occupant's head from one side, the front, and to the other side, such that the occupant's head can be securely restrained regardless of the seat position, reclining angle, and the like. In addition, the present invention does not require the steering wheel, instrument panel, or the like to be used as a reaction surface when the airbag deploys, and the deployment behavior and shape of the airbag can be stabilized without depending on the seat position or the like.

The first chamber and the second chamber can be formed integrally by adhering two pieces of base fabric together.

A bent part can be formed near the boundary between the first chamber and the second chamber, which bends in a direction closer to the occupant's head. Thereby, the second chamber is reliably deployed in front of the occupant's head.

At least the second chamber can be connected to a tether, and the tension of the tether can form the bent part when the airbag is deployed.

The first chamber and second chamber can be formed as separate chambers.

Each of the first chamber and second chamber can be formed by adhering two pieces of base fabrics together. Furthermore, a vicinity of a front end of an inner panel facing an occupant of the base fabric forming the first chamber can be connected to a vicinity of an end part of an inner panel facing the occupant of the base fabric forming the second chamber on the opposite side from the third chamber.

By connecting the inner panels of the base fabric, when the airbag is deployed, the connection portion can be restricted from spreading in an outer direction (away from the occupant's head), thereby facilitating the creation of a curved shape so as to surround the head of the occupant.

The third chamber can be formed by adhering at least two pieces of base fabrics together. Furthermore, an end part of an inner panel facing the occupant of the base fabric forming the second chamber can be connected to an end part of an inner panel facing the occupant of the base fabric forming the third chamber.

A first vent hole can be formed at a connection part between the second chamber and third chamber.

The fourth chamber can be formed by folding one piece of base fabric or adhering two pieces of base fabric together.

A second vent hole can be formed at a connection portion between the third chamber and fourth chamber.

The first chamber can include an upper direction part for first deploying upward and a front direction part connected to the upper direction part and for deploying toward the front.

A side protection chamber, which is connected near a lower end of the upper direction part of the first chamber and protects the side of the body of the occupant, can be further provided.

The inflator can be disposed inside the side protection chamber. Furthermore, the configuration can be such that the expansion gas flows from the side protection chamber to the first chamber, second chamber, third chamber, and fourth chamber.

The second chamber can be extend downward from the first chamber, and can be configured such that an end part of the second chamber that is connected to the third chamber bends upward during deployment of the airbag.

A side airbag device for protecting a side of the occupant can be provided separately from the airbag device on an opposite side of the vehicle seat with respect to the side where the airbag device is stored. For example, the side airbag device is disposed on the so-called near side, and the airbag device for mainly protecting the head is disposed on the far side, such that the occupant can be fully protected.

DESCRIPTION OF THE PREFERRED EMBODIMENTS

The airbag device according to the present invention will be described with reference to the accompanying drawings. In the description below, when an occupant is seated in a seat in a normal posture, the direction the occupant faces is referred to as the "front", the opposite direction is referred to as the "back", and the direction indicating the coordinate axis is referred to as the "front-to-back direction". Moreover, when the passenger is seated in the seat in a regular posture, the right of the passenger is referred to as the "right direction", the left of the passenger is referred to as the "left direction", and the direction indicating the coordinate axis is referred to as the "left and right direction". Furthermore, when the occupant is seated in the seat in a regular posture, a head direction of the occupant is referred to as "up", a waist direction of the occupant is referred to as "down", and a direction indicating the coordinate axis is referred to as an "up-down direction". In addition, the side of a deployed airbag facing the occupant (head) is referred to as the inner side and the opposite side is referred to as the outer side.

Figure 1:
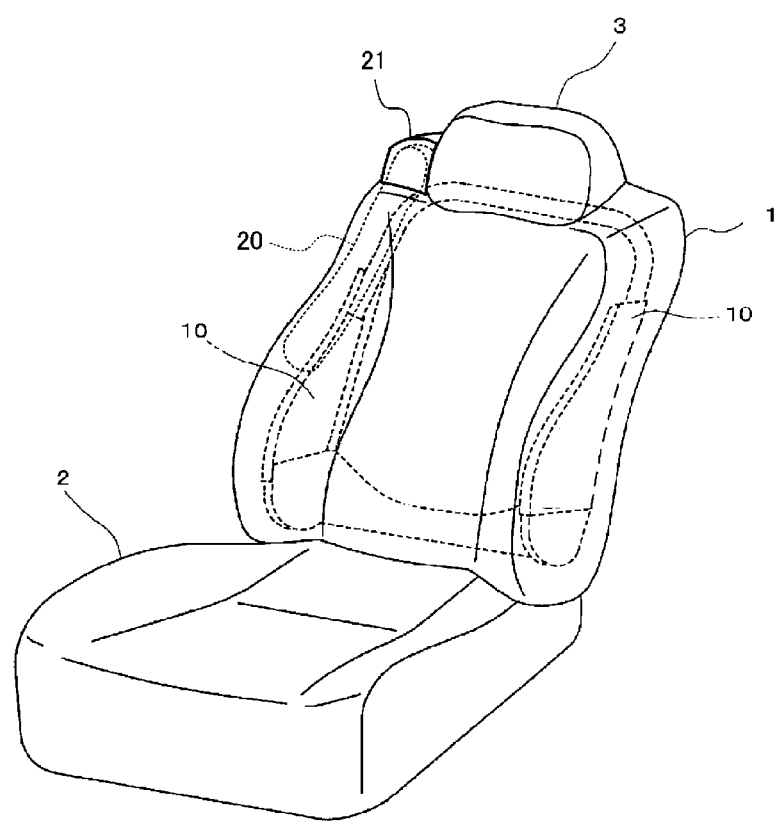
FIG. 1 is a perspective view depicting mainly the appearance form of a vehicle seat to which an airbag device according to the present invention can be applied, and a depiction of the airbag device is omitted.
Figure 2:
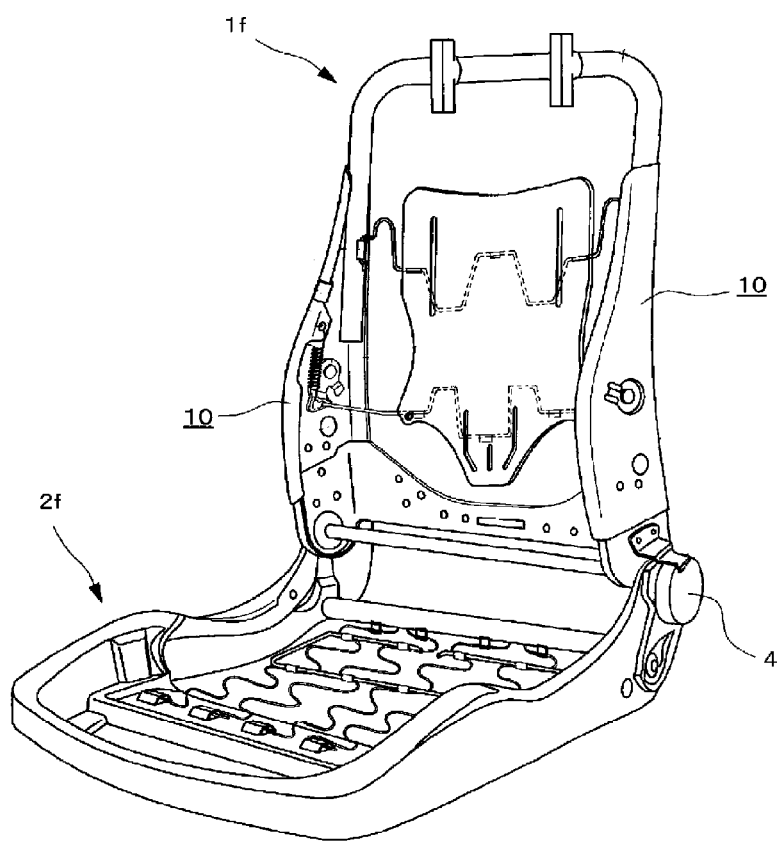
FIG. 2 is a perspective view depicting an internal structure (seat frame) functioning as a framework of the vehicle seat depicted in FIG. 1, and a depiction of the airbag device is omitted.
Figure 3:
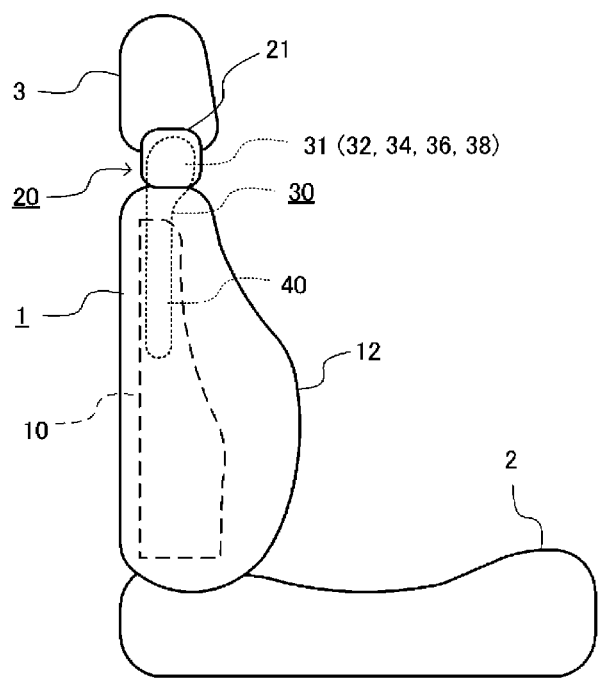
FIG. 3 is a schematic side surface view of the vehicle seat to which the airbag device 20 according to an example of the present invention has been mounted, and depicts a condition in which the airbag device 20 is stored therein, as viewed from the outer side in the vehicle width direction.
Figure 3:
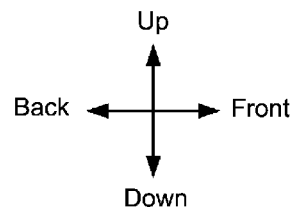

FIG. 1 is a perspective view mainly illustrating the external shape of a vehicle seat used for a passenger protection apparatus according to the present invention, with an illustration of the airbag device (20) omitted. FIG. 2 is a perspective view illustrating an internal structure (seat frame) functioning as a framework of the vehicle seat illustrated in FIG. 1, with an illustration of the airbag device (20) also omitted herein. FIG. 3 is a schematic side surface view of the occupant protection device according to the present invention, and depicts a condition in which the airbag device 20 stored therein on a side surface (far side) of the vehicle seat near a door is observed from the outer side in the vehicle width direction.

As depicted in FIG. 1 and FIG. 2, from the viewpoint of parts, the vehicle seat to which the present invention can be applied includes: a seat cushion 2 of a portion on which an occupant is seated; a seatback 1 forming a backrest; and a headrest 3 connected to an upper end of the seatback 1.

As depicted in FIG. 1, the airbag device 20 according to the present example is stored in a side support part (far side) of the vehicle seat. Code 21 represents a housing for storing one part (head protection part 31) of an airbag configuring the airbag device 20, is an upper part of the seatback 1, and is secured to a side part of a headrest 3. The housing 21 is open to the front or diagonally to the front when the airbag device 20 is activated and an airbag 30 is deployed.

Note that an upper part of the airbag 30 (head protection part 31) can be stored in the housing 21, which is configured as a separate body, or inside the seatback 1 near an upper end. A storing space for the airbag 30 can be flexibly set, particularly in the case of a vehicle seat in which the headrest 3 is integrated into the seatback 1.

As illustrated in FIG. 2, a seatback frame if forming a skeleton of the seat is provided inside the seatback 1, a pad made of a urethane foam material or the like is provided on a surface and periphery thereof, and a surface of the pad is covered with a surface skin such as leather, fabric, or the like. A seating frame 2f is provided on a bottom side of the seat cushion 2, while a pad made of a urethane foaming material or the like is provided on an upper surface and periphery thereof, and the surface of the pad is covered by a surface skin such as leather, fabric, or the like. The seating frame 2f and the seatback frame if are connected via a reclining mechanism 4.

As illustrated in FIG. 2, the seat back frame if is configured into a frame shape by a seat frame 10 disposed laterally spaced apart and extending in the up-down direction, an upper frame connecting the upper end of the seat frame 10, and a lower frame connecting the lower ends thereof. The headrest 3 is configured by providing a cushioned member on an outer side of a headrest frame.

FIG. 3 is a schematic side surface view of the occupant protection device according to the present invention, and depicts a condition in which the airbag device 20 stored therein on a side surface (far side) of the vehicle seat near a door is observed from the outer side in the vehicle width direction.

As depicted in FIG. 3, the airbag device 20 is stored near a right upper end of the seatback 1 of the vehicle seat. Note that the airbag device 20 is disposed on the so-called far side in the present example, but can also be disposed on the near side.

Figure 4:
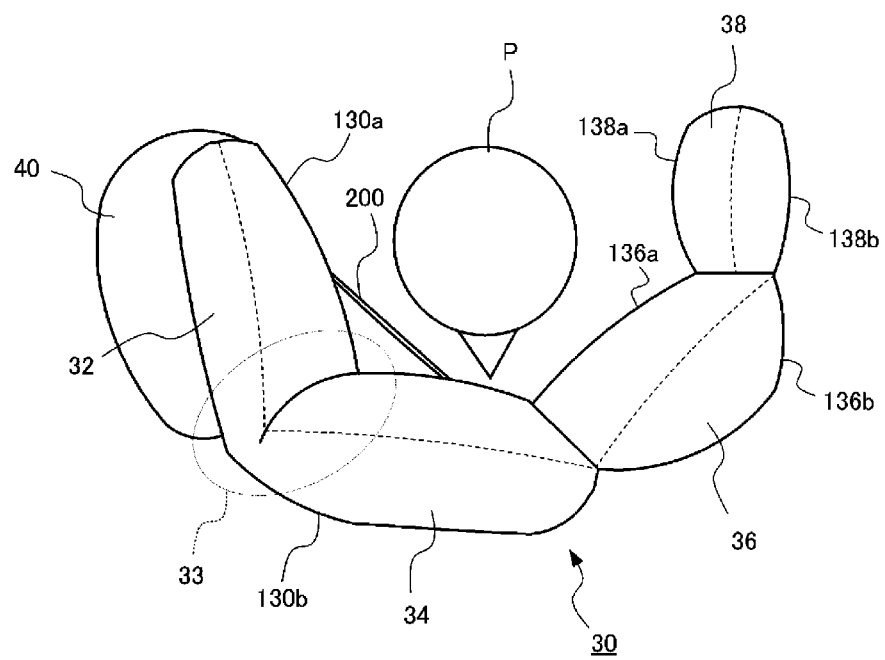
FIG. 4 is a top surface view schematically depicting a condition in which an airbag in the airbag device according to the example of the present invention is deployed.
Figure 4:
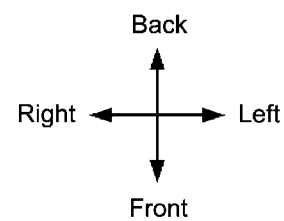
Figure 5:
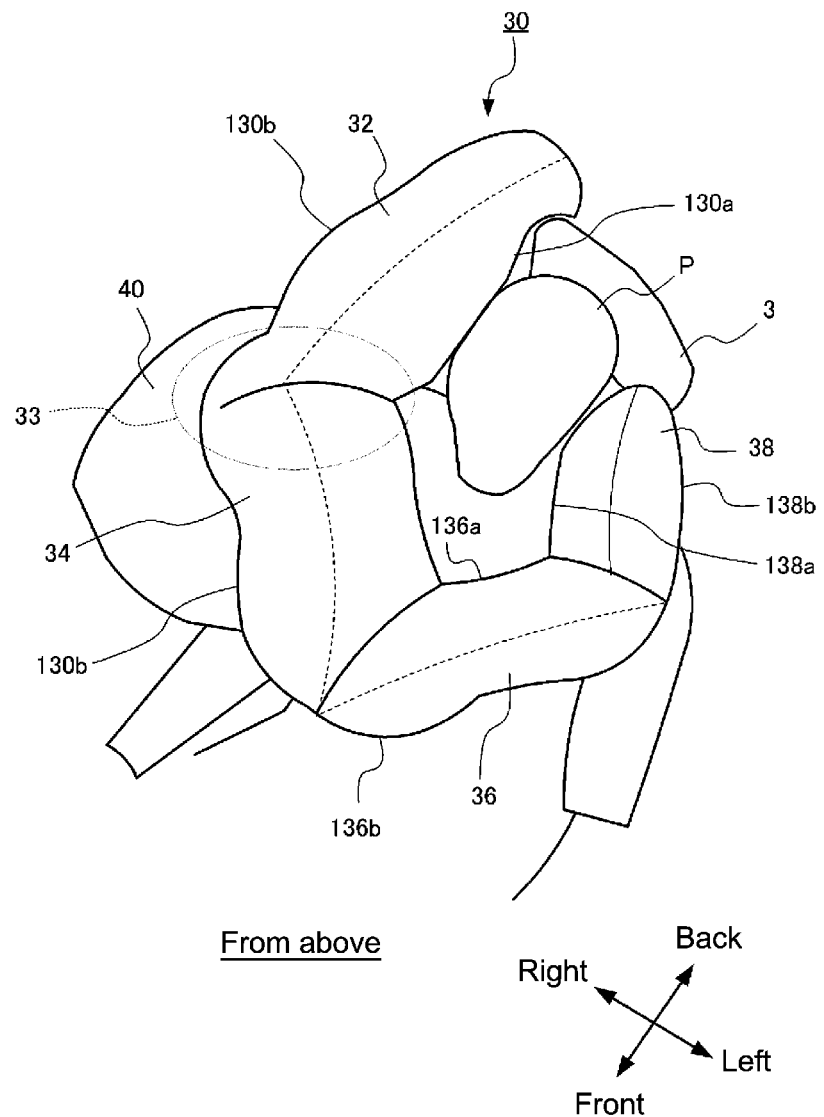
FIG. 5 is a top surface perspective view (overhead view) depicting a condition in which the airbag in the airbag device according to the example of the present invention is deployed.
Figure 6:
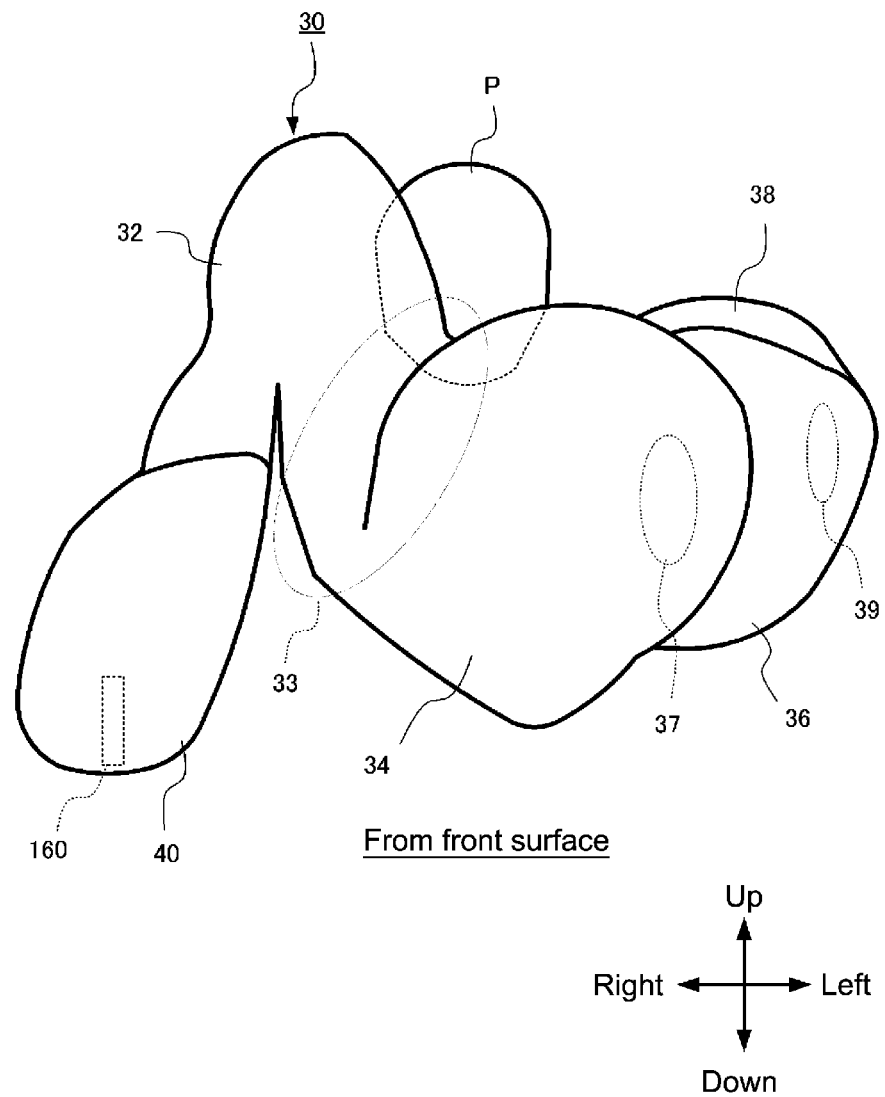
FIG. 6 is a front surface perspective view depicting a condition in which the airbag in the airbag device according to the example of the present invention is deployed.

FIG. 4 is a top surface view schematically depicting a condition in which the airbag (30) in the airbag device 20 according to the example of the present invention is deployed. FIG. 5 is a top surface perspective view (overhead view) depicting a condition in which the airbag (30) is deployed. FIG. 6 is a front surface perspective view depicting a condition in which the airbag (30) is deployed. Note that the dashed lines in FIG. 4 and FIG. 5 indicate stitching lines.

As depicted mainly in FIG. 4, the airbag device 20 according to the present example includes: an inflator 160 for generating expansion gas (see FIGS. 6 and 8); and an airbag 30 for protecting the periphery of the head of an occupant P by deploying from near the right upper end of the vehicle seat. The airbag 30 includes: a first chamber 32 for protecting one side of the occupant P; a second chamber 34 connected to the first chamber 32 and for protecting the front of the head of the occupant P; a third chamber 36 connected to the second chamber 34 and for deploying across the front of the head of the occupant P; and a fourth chamber 38 connected to the third chamber 36 and for deploying at the other side of the occupant P.

The first chamber 32 and the second chamber 34 are formed integrally as a single chamber. A bent part 33 that bends in a direction closer to the head of the occupant P is formed in a vicinity of the boundary between the first chamber 32 and the second chamber 34, which ensures that the second chamber 34 can deploy in front of the occupant's head.

A tether 200 is connected so as to traverse the first chamber 32 and second chamber 34, and the tension of the tether 200 during deployment of the airbag 30 bends the second chamber 34. Note that the tether 200 is connected to an inner surface of the second chamber 34 at one end. The other end of the tether 200 can also be connected to a surface of the first chamber 32 at least rearward of the inner surface of the second chamber 34 or to another member such as a seat frame or the like.

Figure 8:
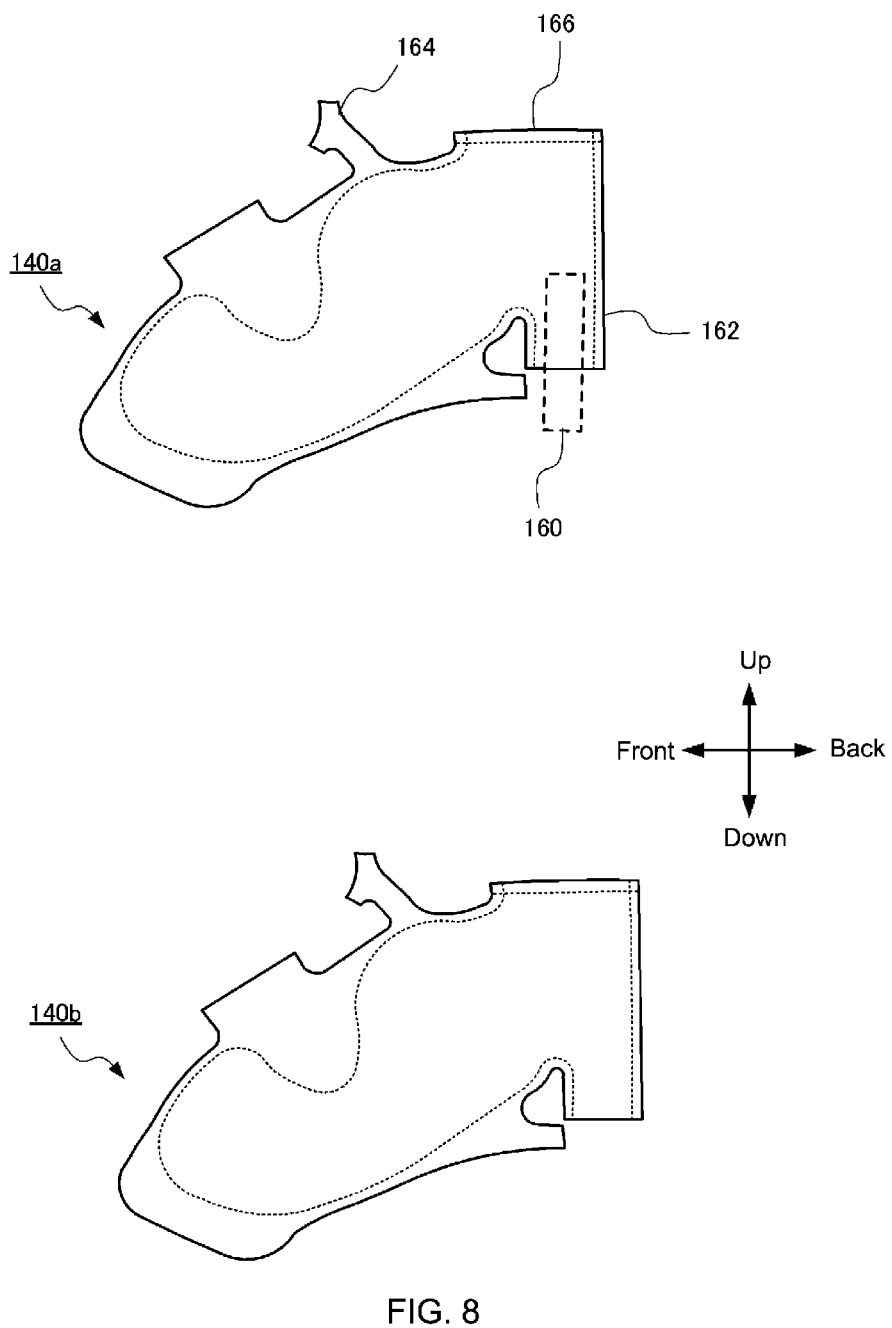
FIG. 8 is a plan view depicting the shape of the panel configuring the airbag used in the airbag device according to the example of the present invention, where a side chamber is formed.

As depicted in FIG. 4 to FIG. 6, a side chamber 40 is connected below the first chamber 32. The side chamber 40 restrains at least the chest from near the right shoulder of the occupant P, but may also be configured to restrain up to the waist. The side chamber 40 and the first chamber 32 may be configured such that both deploy simultaneously or one deploys before the other depending on the direction and timing of the force applied to the occupant to be protected. As depicted in FIG. 6 and FIG. 8, expansion gas is released from the inflator 160 stored in the side chamber 40, and the gas flows sequentially through the first chamber 32 and/or the side chamber 40, the second chamber 34, the third chamber 36, and then the fourth chamber 38.

As depicted in FIG. 4 and FIG. 5, the four chambers (32, 34, 36, and 38) deploy so as to surround a vicinity from near the right side to near the left side of the head of the occupant P. The second chamber 34 simultaneously deploys so as to bend in the direction (inner side) of the occupant side from the first chamber and to bend slightly upward to thus reliably protect the front, including the diagonal front, of the head (face) of the occupant P. In addition, the airbag 30 (at least the first chamber 32 and the fourth chamber 38) is positioned above the shoulder of the occupant P, such that the shoulder of the occupant P can be suppressed from interfering to degrade the deployment behavior. In addition, providing the airbag 30 above the shoulder of the occupant P can reduce the distance from the airbag 30 to the head of the occupant P, and thus the head of the occupant can quickly be restrained.

As depicted in FIG. 4 and FIG. 5, the longitudinal direction of the second chamber 34, when viewed from the top when the airbag 30 is expanded and deployed, is provided so as to extend in front of the occupant P at an angle from a bent region 200a toward the long longitudinal direction in the front-back direction of the first chamber 32. In addition, the expansion/deployment direction of the third chamber 36 facing a gas inlet port of the fourth chamber 38 from a gas inlet port of the third chamber 36, which is near a terminus of the second chamber 34, is provided facing roughly opposite the longitudinal direction of the expansion/deployment direction of the first chamber 32 in the front-back direction, and at an angle in a direction approaching the occupant P from the terminus of the second chamber 34 with respect to the longitudinal direction of the expanded and deployed second chamber 34. Furthermore, the expansion/deployment direction of the fourth chamber 38 from a gas inlet port of the fourth chamber 38, which is near a terminus of the third chamber 36, is provided facing roughly opposite the longitudinal direction of the expansion/deployment direction of the first chamber 32 in the front-back direction, and at an angle in a direction approaching the occupant side P from the terminus of the third chamber 36 with respect to the expansion/deployment direction of the third chamber 36. With such a configuration, the airbag 30 expands and deploys so as to wind around a circumference of the head of the occupant P from one shoulder opening of the occupant P.

Figure 7:
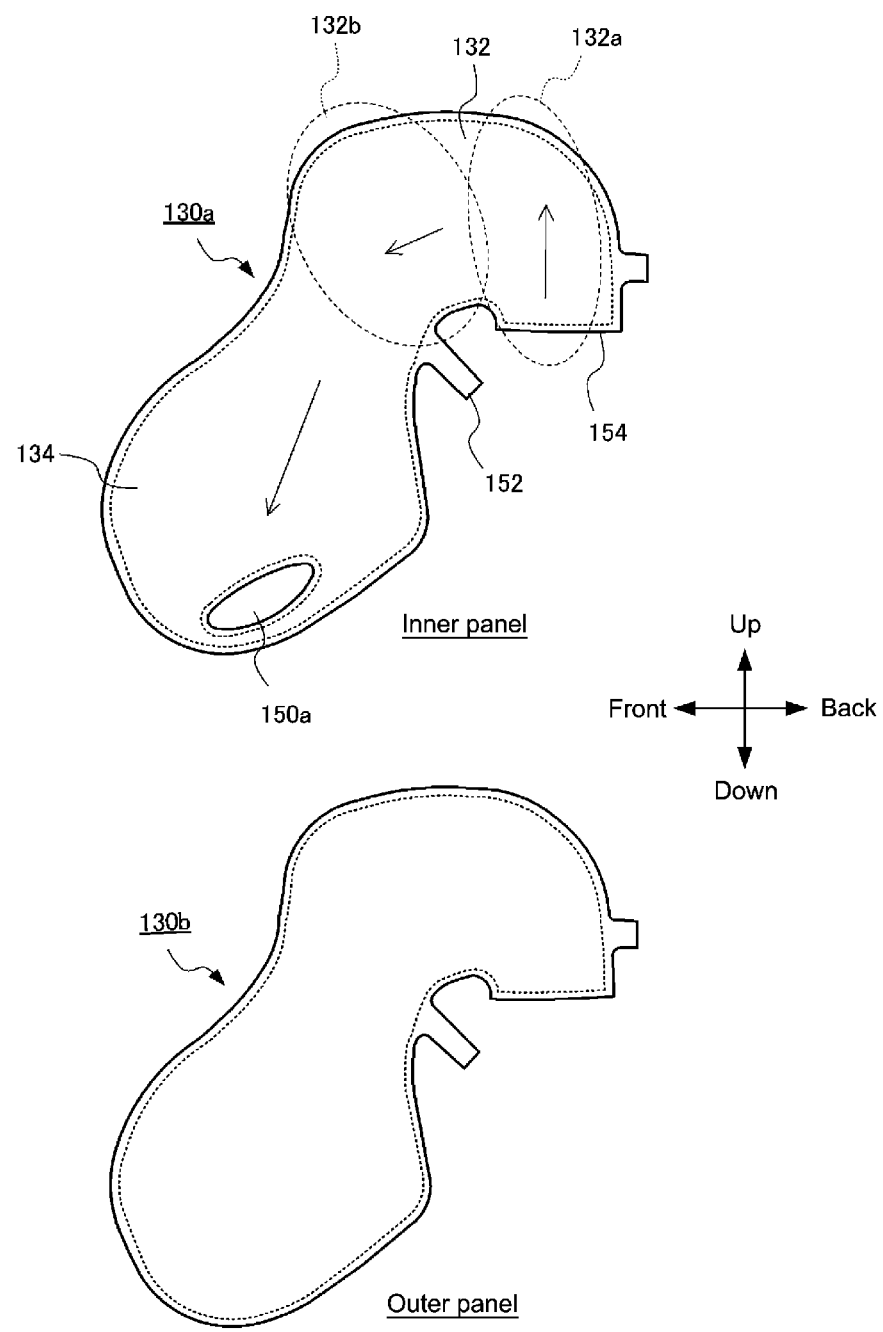
FIG. 7 is a plan view depicting the shape of a panel configuring the airbag used in the airbag device according to the example of the present invention, where a first chamber and second chamber are formed.

FIG. 7 is a plan view depicting a panel (base fabric) forming the first chamber 32 and the second chamber 34. As depicted in FIG. 7, the first chamber 32 and the second chamber 34 are formed integrally by adhering two pieces of base fabric 130a (inner panel) and 130b (outer panel) together. In the drawing, code 132 represents a region corresponding to the first chamber 32, and 134 represents a region corresponding to the second chamber. When the first chamber 32 and the second chamber 34 deploy, the inner panel 130a faces the occupant P side.

The first chamber 32 (the region 132) includes: an opening 154 connected to the side chamber 40; and a tab 152 connected to a tab 164 of the side chamber 40. The expansion gas flows into the first chamber 32 from the side chamber 40 through the opening 154. A vent opening 150a, which is in fluid communication with the third chamber 36, is formed in the inner panel near the terminus of the second chamber 34, and is connected together with a vent opening 150b of an inner panel 136a of the third chamber 36 (see FIG. 9) by stitching around a perimeter. Furthermore, the vent openings 150a, 150b form a vent hole 37.

The first chamber 32 is roughly configured from an upper direction part 132a for directing gas flowing in from the opening 154 upward, and a front direction part 132b connected to the upper direction part 132a and for deploying toward the front. Note that in FIG. 7, dashed lines for those other than the upper direction part 132a and the front direction part 132b indicate stitching lines.

In the first chamber 32, the expansion gas flows first into the upper direction part 132a, which allows the first chamber 32 to be quickly and reliably raised on an upper part of a shoulder of the occupant P.

FIG. 8 is a plan view depicting a panel (base fabric) forming the side chamber 40. As depicted in FIG. 8, the side chamber 40 is formed by adhering two pieces of base fabric 140a (inner panel) and 140b (outer panel) together. In the diagram, code 166 represents an opening connected to the opening 154a of the first chamber 32, and code 162 represents an inflator holding part for storing the inflator 160. In addition, code 164 represents a tab connected to the tab 152 of the first chamber 32. The connection tab 164 is provided on an upper edge part of the side chamber 40. The tab 152 of the first chamber 32 is provided on a lower edge part of the first chamber, and the connection therebetween reduces unintentional pivoting during mutual expansion and deployment, thereby increasing the stability of expansion and deployment. In addition, the connection therebetween allows the airbag cushions to not become disjointed during expansion and deployment in the expansion/deployment direction, allowing for more integral and comprehensive protection for the occupant P.

The side chamber 40 and the first chamber 32 are directly connected at respective openings 154a, 166 thereof, and the deployment posture can be controlled by connecting the tabs 152, 166 together. Note that in FIG. 8, the dashed lines for those other than the 160 inflator indicate stitching lines.

Figure 9:
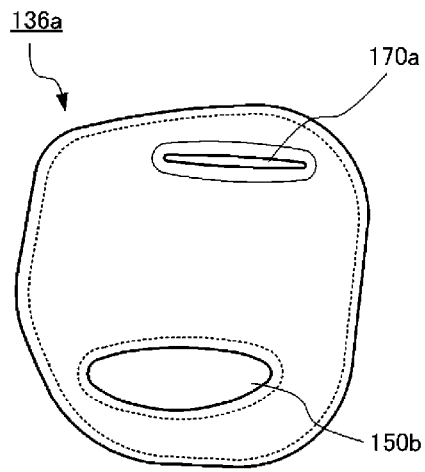
FIG. 9 is a plan view depicting the shape of the panel configuring the airbag used in the airbag device according to the example of the present invention, where a third chamber is formed.
Figure 9:
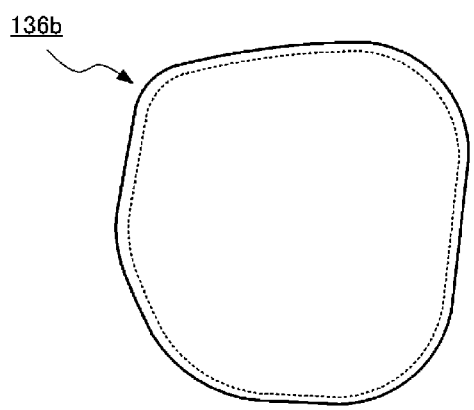

FIG. 9 is a plan view depicting a panel (base fabric) forming the third chamber 36. The dashed lines in FIG. 9 indicate stitching lines.

As depicted in FIG. 9, the third chamber 36 is formed by adhering two pieces of base fabric 136a (inner panel) and 136b (outer panel) together. The vent opening 150b connected to the vent opening 150a of the second chamber 34 is formed at a vicinity of one end part of the inner panel 136a. In addition, a vent opening 170a connected to a vent opening 170b of the fourth chamber 38 is formed at a vicinity of the other end part of the inner panel 136a. Furthermore, the vent openings 170a, 170b form a vent hole 39 (FIG. 7 and FIG. 9). Note that the vent hole opening 150b is longer in the short direction and has a larger opening area than the vent opening 170a.

Figure 10:
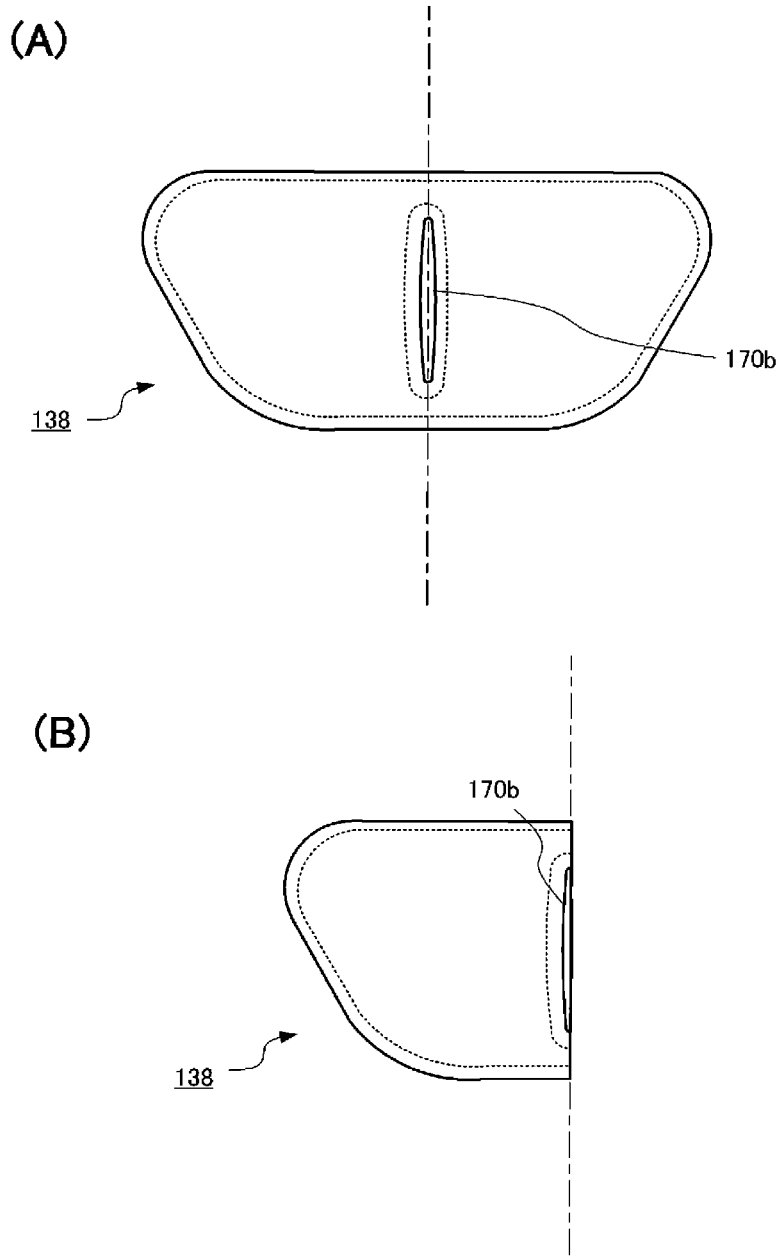
FIG. 10 is a plan view depicting the shape of the panel configuring the airbag used in the airbag device according to the example of the present invention, where a fourth chamber is formed.

FIG. 10 is a plan view depicting a panel (base fabric) 138 forming the fourth chamber 38. In FIG. 10, the dashed lines around an outer edge part and the vent opening 170b indicate the stitching lines.

As depicted in FIG. 10(B), the fourth chamber 38 is formed into a bag shape by folding one panel 138 in half. A vent hole 170b, which is connected to the vent hole 170a of the third chamber, is formed near the longitudinal center of the panel 138, and the center line along the longitudinal direction of the vent opening 170b is a crease of the panel 138.

Figure 11:
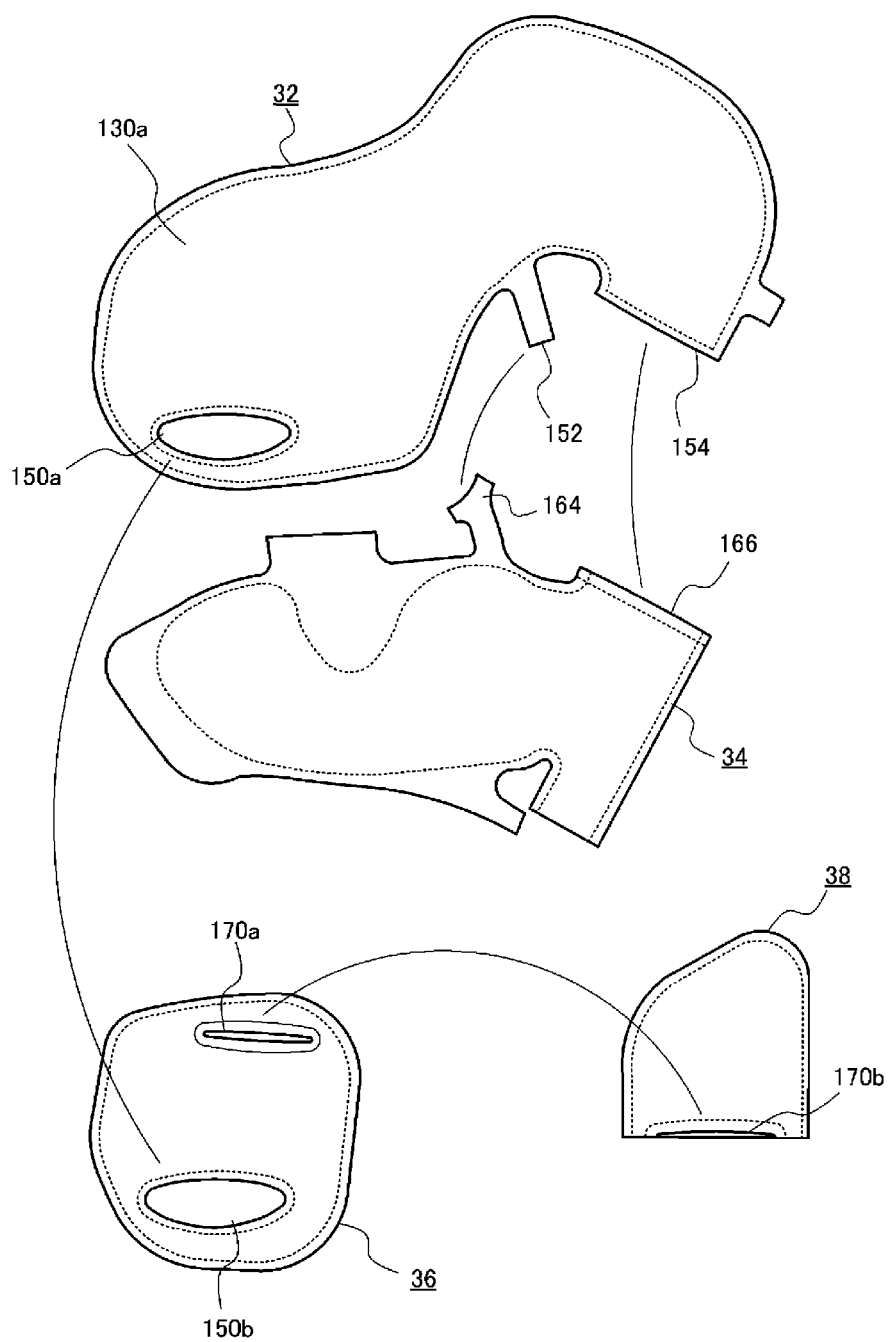
FIG. 11 is a plan view for describing the connection of the panels depicted in FIG. 7 to FIG. 10.
Figure 12:
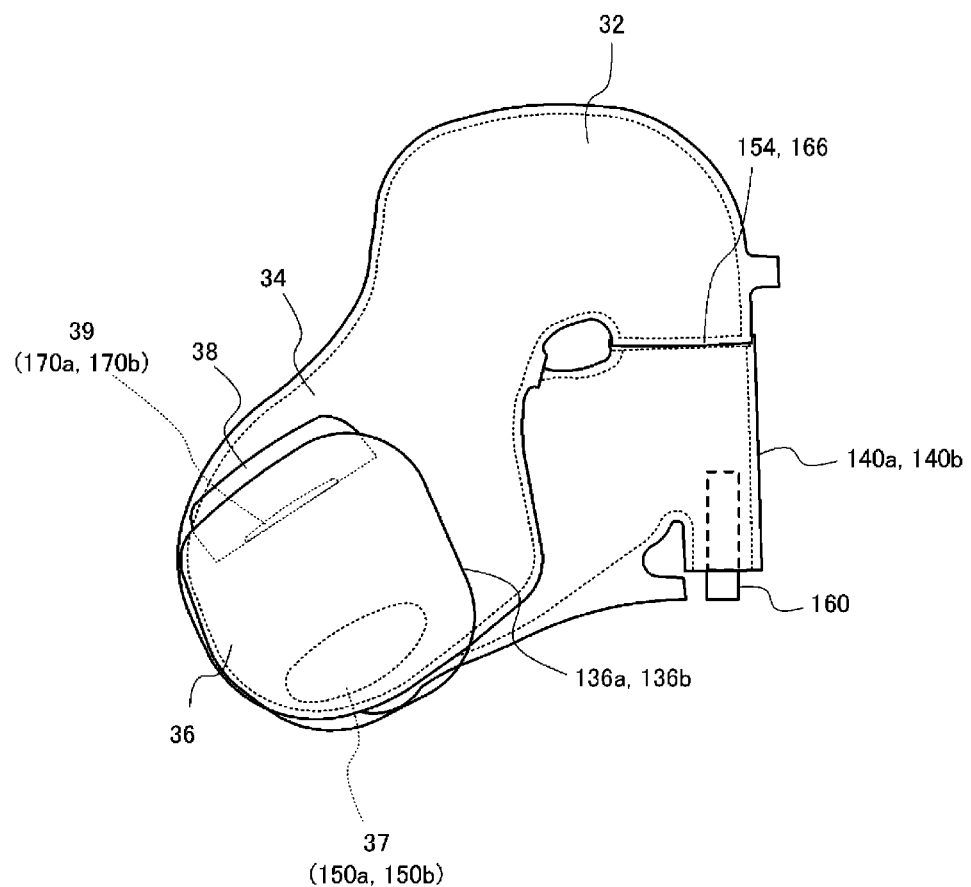
FIG. 12 is a plan view depicting a state where the panels depicted in FIG. 7 to FIG. 10 are connected.

FIG. 11 is a plan view for describing the connection of the panels depicted in FIG. 7 to FIG. 10. In addition, FIG. 12 is a plan view depicting a state where the panels depicted in FIG. 7 to FIG. 10 are connected. As depicted in FIG. 11, the chamber integrating the first chamber 32 and second chamber 34 has the largest capacity, followed by the side chamber 40. In contrast, the capacity of the third chamber 36 is small, and the capacity of the fourth chamber 38 is designed to be even smaller.

The second chamber 34 and the third chamber 36 are connected by stitching only around the vent openings 150a and 150b. In addition, the third chamber 36 and fourth chamber 38 are connected by stitching only around the vent openings 170a and 170b.

(Airbag Deployment Behavior)

In the airbag device 20 according to the present example, when a vehicle crash event occurs, the inflator 160 is activated and the expansion gas flows from the inflator holding part 162 at the rear end part of the side chamber 40 into the first chamber 32. When the expansion gas flows into the first chamber 32, the upper direction part 132a (FIG. 7) expands first, followed by the front direction part 132b. Next, gas flows from the first chamber 32 into the second chamber 34.

At this time, the tether 200 (FIG. 4) connects the first chamber 32 to the second chamber 34 or the second chamber 34 to the seat frame. Therefore, the second chamber 34 does not deploy to the front, but bends near the boundary with the first chamber 32 and deploys toward the front of the occupant (FIGS. 4 and 5). In addition, the second chamber 34 is bent such that the a tip end side faces upward and deploys such that the vent opening 150a is generally vertical, as depicted in FIG. 6.

Next, the expansion gas flows from the second chamber 34 into the third chamber 36 through the vent hole 37, and the third chamber 36 deploys from the front of the occupant P near the left side of the head. The inner panel 134a of the second chamber 34 and inner panel 136a of the third chamber 36 are connected around the vent hole 37. Therefore, the behavior of the third chamber 36 to deploy in the outer direction (away from the head of the occupant) is restricted, creating a curved shape so as to surround the head of the occupant.

Next, the expansion gas flows from the third chamber 36 into the fourth chamber 38 through the vent hole 39, and the fourth chamber 38 deploys near the left side of the head of the occupant P. The inner panel 136a of the third chamber 36 and the fourth chamber 36 are connected around the vent hole 39. Therefore, the behavior of the fourth chamber 36 to deploy in the outer direction (away from the head of the occupant) is restricted, creating a curved shape so as to surround the head of the occupant P.

Other Example

Figure 13:
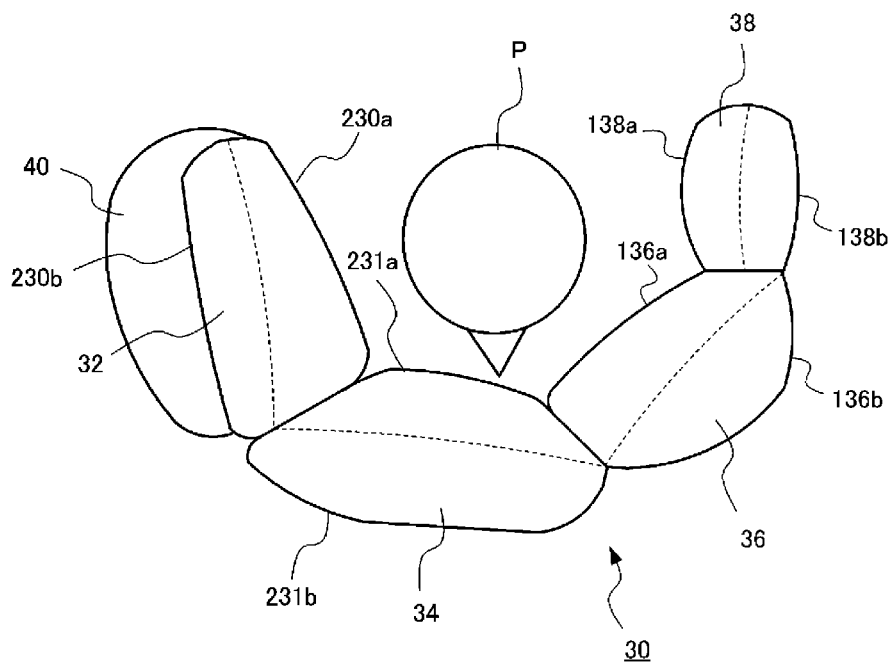
FIG. 13 is a top surface view depicting a condition in which an airbag in an airbag device according to another example of the present invention is deployed.

FIG. 13 is a top surface view depicting a condition in which the airbag 30 in an airbag device according to another example of the present invention is deployed. In the present example, unlike the example described above, the first chamber 32 and the second chamber 34 are formed as separate chambers.

The first chamber 32 is formed by adhering two pieces of base fabric 230a, 230b together. In addition, the second chamber 34 is formed by adhering two pieces of base fabric 231a, 231b together. Furthermore, a vicinity of a front end (vicinity of a terminus) of the inner panel 230a facing the occupant P of the base fabric forming the first chamber 32 can be connected to a vicinity of an end part of the inner panel 231a facing the occupant P of the base fabric forming the second chamber 34 on the opposite side from the third chamber 36. A vent hole is formed at a boundary portion between the first chamber 32 and the second chamber 34.

In the present invention, the side airbag device 20 for protecting a side of the occupant can be provided separately from the airbag device 20 on an opposite side of the vehicle seat with respect to the side where the airbag device is stored. For example, the side airbag device is disposed on the so-called near side, and the airbag device 20 for mainly protecting the head is disposed on the far side, such that the occupant can be fully protected.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative and not limiting. Without departing from the spirit and scope of the present invention, the described embodiments may take on various modifications.

The invention claimed is:

1. An airbag device stored in a vehicle seat, comprising:
an inflator for generating expansion gas; and
an airbag for deploying near an upper end of the vehicle seat to protect the periphery of the head of an occupant, wherein
the airbag includes:
a first chamber for protecting one side of the occupant;
a second chamber connected to the first chamber and for protecting the front of the occupant's head;
a third chamber connected to the second chamber and for deploying from the front of the occupant's head across to the other side of the occupant, wherein the expansion gas flows from the second chamber into the third chamber through a first vent opening connecting the second chamber to the third chamber; and
a fourth chamber connected to the third chamber and for deploying at the other side of the occupant, wherein the expansion gas flows from the third chamber into the fourth chamber through a second vent opening between the third chamber and the fourth chamber.

2. The airbag device according to claim 1, wherein the first chamber and second chamber are integrally formed by adhering two pieces of base fabric together.

3. The airbag device according to claim 2, wherein a bent part is formed near the boundary between the first chamber and the second chamber, which bends in a direction closer to the occupant's head.

4. The airbag device according to claim 3, wherein at least the second chamber is connected to a tether, and the tension of the tether forms the bent part when the airbag is deployed.

5. The airbag device according to claim 1, wherein the first chamber and second chamber are formed as separate chambers.

6. The airbag device according to claim 5, wherein each of the first chamber and second chamber is formed by adhering two pieces of base fabric together, and
a vicinity of a front end of an inner panel facing the occupant of the base fabric forming the first chamber is connected to a vicinity of an end part of an inner panel facing the occupant of the base fabric forming the second chamber on the opposite side from the third chamber.

7. The airbag device according to claim 1, wherein the third chamber is formed by adhering at least two pieces of base fabric together, and
an end part of an inner panel facing the occupant of the base fabric forming the second chamber is connected to an end part of an inner panel facing the occupant of the base fabric forming the third chamber.

8. The airbag device according to claim 1, wherein the fourth chamber is formed by folding one piece of base fabric or adhering two pieces of base fabric together.

9. The airbag device according to claim 1, wherein the first chamber includes an upper direction part for first deploying upward and a front direction part connected to the upper direction part and for deploying toward the front.

10. The airbag device according to claim 9, further comprising a side protection chamber connected near a lower end of the upper direction part of the first chamber and for protecting the side of the body of the occupant.

11. The airbag device according to claim 10, wherein the inflator is disposed inside the side protection chamber and configured such that expansion gas flows from the side protection chamber into the first chamber, the second chamber, the third chamber, and the fourth chamber.

12. The airbag device according to claim 1, wherein the second chamber extends downward from the first chamber, and
an end part of the second chamber that is connected to the third chamber bends upward during deployment of the airbag.

13. The airbag device according to claim 1, wherein a side airbag device for protecting a side of the occupant is provided separately from the airbag device on an opposite side of the vehicle seat with respect to the side where the airbag device is stored.

* * * * *